US010182352B2

(12) United States Patent
Saffre et al.

(10) Patent No.: US 10,182,352 B2
(45) Date of Patent: Jan. 15, 2019

(54) SMALL CELL RESOURCE ALLOCATION (71) Applicant: British Telecommunications Public Limited Company, London (GB)

(72) Inventors: Fabrice Saffre, London (GB); Anvar Tukmanov, London (GB); Mark Shackleton, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/503,567

(22) PCT Filed: Jul. 28, 2015

(86) PCT No.: PCT/EP2015/067278
§ 371 (c)(1),
(2) Date: Feb. 13, 2017

(87) PCT Pub. No.: WO2016/026656
PCT Pub. Date: Feb. 25, 2016

(65) Prior Publication Data
US 2017/0230835 A1    Aug. 10, 2017

(30) Foreign Application Priority Data

Aug. 22, 2014  (EP) .................................... 14275174

(51) Int. Cl.
*H04W 72/00* (2009.01)
*H04W 16/06* (2009.01)
(Continued)

(52) U.S. Cl.
CPC ............ *H04W 16/06* (2013.01); *H04W 16/32* (2013.01); *H04W 84/045* (2013.01)

(58) Field of Classification Search
CPC ..... H04W 16/06; H04W 16/08; H04W 16/10; H04W 16/14; H04W 16/32; H04W 36/04;
(Continued)

(56) References Cited

U.S. PATENT DOCUMENTS

2009/0310545 A1   12/2009  Tateson et al.
2010/0142454 A1    6/2010  Chang
(Continued)

FOREIGN PATENT DOCUMENTS

CN       102186174 A     9/2011
CN       103379498 A    10/2013
(Continued)

OTHER PUBLICATIONS

International Search Report for corresponding International Application No. PCT/EP2015/067278 dated Oct. 5, 2015; 4 pages.
(Continued)

*Primary Examiner* — Temica M Beamer
(74) *Attorney, Agent, or Firm* — Amy M. Salmela; Patterson Thuente Pedersen, P.A.

(57) ABSTRACT

This disclosure provides a method of allocating a resource in a network of small cells, and a device for implementing the method, the method comprising: a first small cell detecting that its resource demand exceeds its resource allocation; the first small cell selecting a new resource that is being used by a second small cell; and the first small cell allocating the new resource to either the first or second small cell, wherein the probability the new resource is allocated to the first small cell is based on the first small cell's resource demand.

11 Claims, 10 Drawing Sheets (51) Int. Cl.
*H04W 84/04* (2009.01)
*H04W 16/32* (2009.01)

(58) Field of Classification Search
CPC ..... H04W 36/22; H04W 36/30; H04W 72/04; H04W 72/082; H04W 74/02; H04W 76/02; H04W 28/04; H04W 28/08; H04W 28/16; H04W 24/00; H04W 24/02; H04W 92/02; H04W 84/042; H04W 84/045
USPC ............. 455/450, 451, 452.1, 453, 444, 447
See application file for complete search history.

(56) References Cited

U.S. PATENT DOCUMENTS

| | | | |
|---|---|---|---|
| 2010/0172754 | A1 | 7/2010 | Flanagan |
| 2011/0274009 | A1 | 11/2011 | Cooper |
| 2011/0274101 | A1 | 11/2011 | Cooper |
| 2013/0121191 | A1* | 5/2013 | Song ................... H04J 11/0056 370/252 |
| 2013/0210447 | A1* | 8/2013 | Moe ..................... H04W 28/16 455/453 |
| 2014/0128088 | A1* | 5/2014 | Farhadi ................ H04W 16/16 455/452.1 |
| 2015/0119057 | A1 | 4/2015 | Fujito |
| 2015/0365941 | A1* | 12/2015 | Liu ................... H04W 72/0446 370/280 |
| 2017/0099617 | A1* | 4/2017 | Tomici ................. H04W 28/08 |

FOREIGN PATENT DOCUMENTS

| | | |
|---|---|---|
| EP | 2 779 728 A1 | 9/2014 |
| WO | WO 2012/139653 A1 | 10/2012 |
| WO | WO 2013/015255 A1 | 1/2013 |
| WO | WO 2013/075340 A1 | 5/2013 |
| WO | WO 2014113941 A1 * | 7/2014 ........ H04W 72/0446 |

OTHER PUBLICATIONS

Written Opinion of the International Searching Authority for corresponding International Application No. PCT/EP2015/067278 dated Oct. 5, 2015; 5 pages.
International Preliminary Report on Patentability for corresponding International Application No. PCT/EP2015/067278 dated Oct. 12, 2016; 15 pages.
Written Opinion of the International Preliminary Examining Authority for corresponding International Application No. PCT/EP2015/067278 dated Jul. 25, 2016; 5 pages.
Extended European Search Report for corresponding EP Patent Application No. 14275174.2 dated Apr. 9, 2015; 7 pages.
Laselva et al., "Self-Optimisation," LTE Self-Organising Networks (SON) Network Management Automation for Operational Efficiency, First Edition (2012) John Wiley & Sons, Ltd; p. 135-234.
Liang et al., "Resource allocation with interference avoidance in OFDMA femotcell networks," IEEE Transactions on Vehicular Technology (2012) vol. 61, No. 5; p. 2243-2255.
Shahid et al., "A decentralized heuristic approach towards resource allocation in femtocell networks," Entropy (2013) 15; p. 2524-2547.

* cited by examiner

= free

= used by first femtocell 10

= used by second femtocell 20

= used by third femtocell 30

= used by both first and third femtocell 10, 30

= used by both second and third femtocell 10, 30

SMALL CELL RESOURCE ALLOCATION

CROSS-REFERENCE TO RELATED APPLICATIONS

The present application is a National Phase entry of PCT Application No. PCT/EP2015/067278, filed on 28 Jul. 2015, which claims priority to EP Patent Application No. 14275174.2, filed on 22 Aug. 2014, which are hereby fully incorporated herein by reference.

TECHNICAL FIELD

The present disclosure relates to resource allocation in small cell systems.

BACKGROUND 4G networks are the fourth generation of mobile telecommunication technology standards, and include the WiMAX and LTE-Advanced network standards. The 4G networks include a new architecture to support a small-scale basestation, which may be installed in private homes (known as a femto access point, or femtocell), or outdoor areas (known as metrocells or picocells, depending on the coverage area). These cells are collectively known as small cells.

Figure 1:
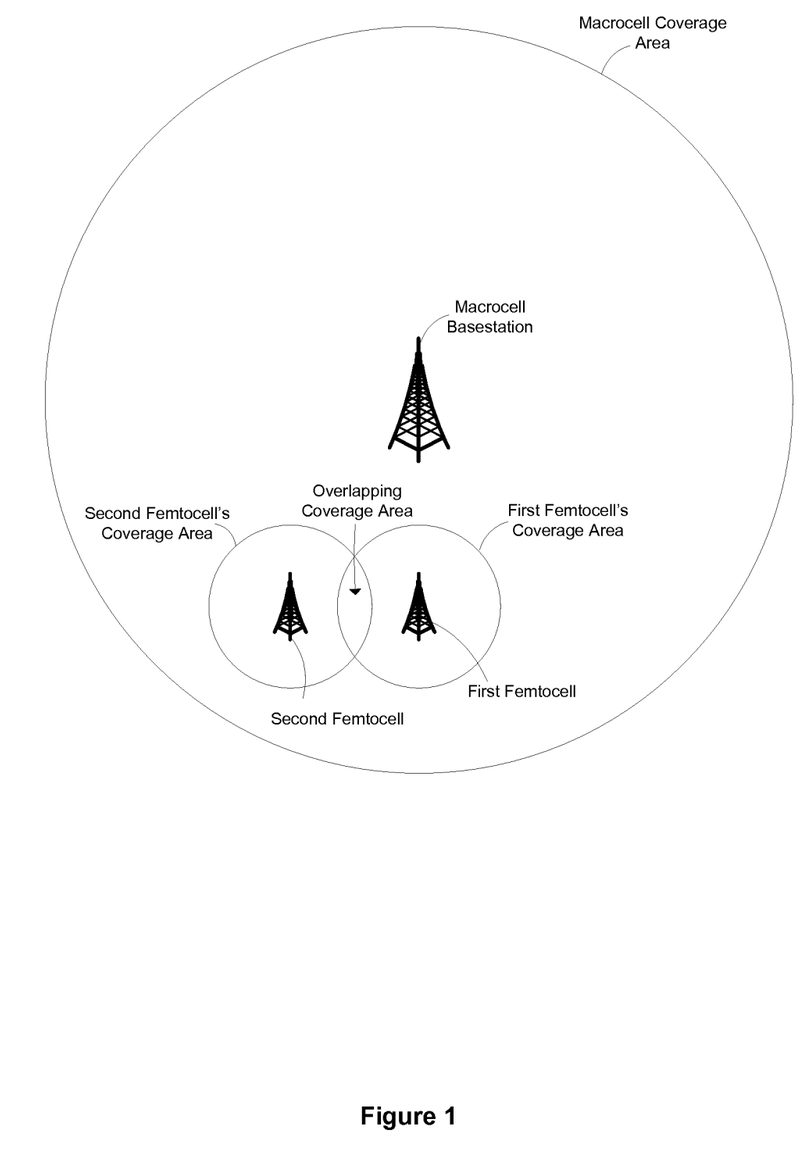
FIG. 1 illustrates a macrocell, and a first and second femtocell having overlapping coverage areas.

Small cells are expected to be widely adopted. However, as small cells are designed to be deployed by end-users with minimal intervention from Mobile Network Operators, MNOs, several issues arise. For example, if two small cells have overlapping coverage areas (as shown in FIG. 1, and hereinafter known as "neighboring small cells") but transmit using the same frequency and time slots, then signals from these two neighboring small cells will interfere with each other and data throughput is significantly reduced. This form of interference is known as co-tier, as the interference is between two elements on the same tier of the network. There may also be interference between signals from the macrocell and small cell when they use the same frequency and time slots, known as cross-tier interference. To address these issues and minimize interference in the network, MNOs employ various resource management techniques.

A first technique involves the MNO using a centralized resource management node to allocate resource blocks (i.e. a resource unit discretized in frequency/time slot space) to each small cell in the network. The centralized node is able to determine the resource requirements of each small cell and then allocate resources in an equitable manner. Examples of centralized resource management nodes can be found in "Resource Allocation with Interference Avoidance in OFDMA Femtocell Networks", Liang et al, IEEE Transactions on Vehicular Technology, June 2012, and in International Patent Application Publication No. 2012/139653. However, as the size of the small cell network increases, there is a corresponding increase in control traffic. This solution is therefore not ideal, as small cell systems are expected to be widely adopted.

An alternative solution is a distributed approach to resource allocation, such that each small cell independently determines its own resource allocation. This may involve the small cell determining the resource requirements of its neighboring small cells, before calculating its own resource allocation based on an algorithm. This has the benefit of reducing the amount of control traffic on the network compared to the centralized node approach above, but the resource allocation tends to be too conservative using this technique (as avoiding interference is more preferable to MNOs than maximizing throughput).

Chinese patent application publication number 103379498 A discloses a resource allocation method in which in which a first basestation determines its spectrum utilization information and sends it to a second basestation. The second basestation then allocates a spare resource either to itself or to the first basestation based on this information. This is a form of distributed resource allocation, but with some control information passing between basestations.

It is therefore desirable to alleviate some or all of the above problems.

SUMMARY OF THE INVENTION

According to a first aspect of the disclosure, there is provided a method of allocating a resource in a network of small cells, the method comprising: a first small cell detecting that its resource demand exceeds its resource allocation; the first small cell selecting a new resource that is being used by a second small cell; the first small cell determining whether the new resource should be allocated to either the first or second small cell, wherein the probability the new resource is allocated to the first small cell is based on the first small cell's resource demand; and the first small cell allocating the new resource according to the determined allocation.

The present disclosure provides a distributed resource allocation architecture in which a small cell may self-allocate a resource which is already being used by another small cell, wherein the probability the resource is allocated to the small cell is based on its resource demand. In this manner, the network's resources are allocated equitably, such that small cells with a larger resource demand are more likely to be allocated resources in the network compared to small cells with a smaller resource demand.

Furthermore, the method of the present disclosure is applied in a distributed manner such that each small cell in a network may determine its resource demand and may capture further resources when its resource demand is greater than its resource allocation. The total resources in the network are therefore dynamically distributed such that they react to changing conditions in the network.

The probability the new resource is allocated to the first small cell may be proportional to a ratio of its resource demand to its resource allocation. Thus, by taking into account the resource allocation of the small cell as well as its resource demand, the method of the present disclosure ensures a fair distribution of resources across the network of small cells.

The probability the new resource is allocated to the first small cell may be inversely proportional to a sum of a ratio of the first small cell's resource demand to its resource allocation and a ratio of the second small cell's resource demand to its resource allocation. In this manner, it is less likely for a small cell to capture the resources of another small cell having a small resource surplus than a large resource surplus, again encouraging an equitable distribution of resources about the network.

The method may further comprise the first small cell iteratively allocating new resources to itself until its resource allocation satisfies its resource demand.

The method may further comprise, initially, the first small cell determining the resource block allocation of the second small cell; wherein before the step of the first small cell selecting the new resource that is being used by the second small cell, the method may further comprise: the first small cell allocating a free resource to itself until there are no further free resources. Accordingly, the present disclosure may allocate free resources (i.e. those not being used by a neighbouring cell in an overlapping coverage area), before allocating resources that are currently being used. This ensures that all resources are used in the network before they are reallocated.

The method may further comprise: the first small cell selecting a new resource that is being used by the second small cell and a third small cell; and the first small cell allocating the new resource to either the first small cell or both the second and third small cells based on the first small cell's resource demands. Thus, the method of the present disclosure may also reallocate resources that are being used by more than one small cell (e.g. in the event the resources are being used by two neighboring small cells, which do not have an overlapping coverage area with each other).

A computer program is also provided containing computer-executable code which, when executed on a computer, causes the computer to perform the method of the first aspect of the present disclosure.

According to a second aspect of the disclosure, there is provided a device for allocating a resource in a network of small cells, the device comprising: a detector configured to detect that a first small cell's resource demand exceeds its resource allocation; a selector configured to select a new resource that is being used by a second small cell; and a resource allocator configured to allocate the new resource to either the first or second small cell, wherein the probability the new resource is allocated to the first small cell is based on the first small cell's resource demand.

The probability the new resource is allocated to the first small cell may be proportional to a ratio of its resource demand to its resource allocation. The probability may also be inversely proportional to a sum of a ratio of the first small cell's resource demand to its resource allocation and a ratio of the second small cell's resource demand to its resource allocation.

The resource allocator may be configured to iteratively allocate resources to the first small cell until its resource allocation satisfies its resource demand.

The detector may be further configured to detect the resource allocation of the second small cell; and the resource allocator may be further configured to allocate a free resource to the first small cell until there are no further free resources.

The selector may be configured to select a new resource that is being used by the second small cell and a third small cell; and the resource allocator may be configured to allocate the new resource to either the first small cell or the second and third small cells based on the first small cell's resource demand.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 2:
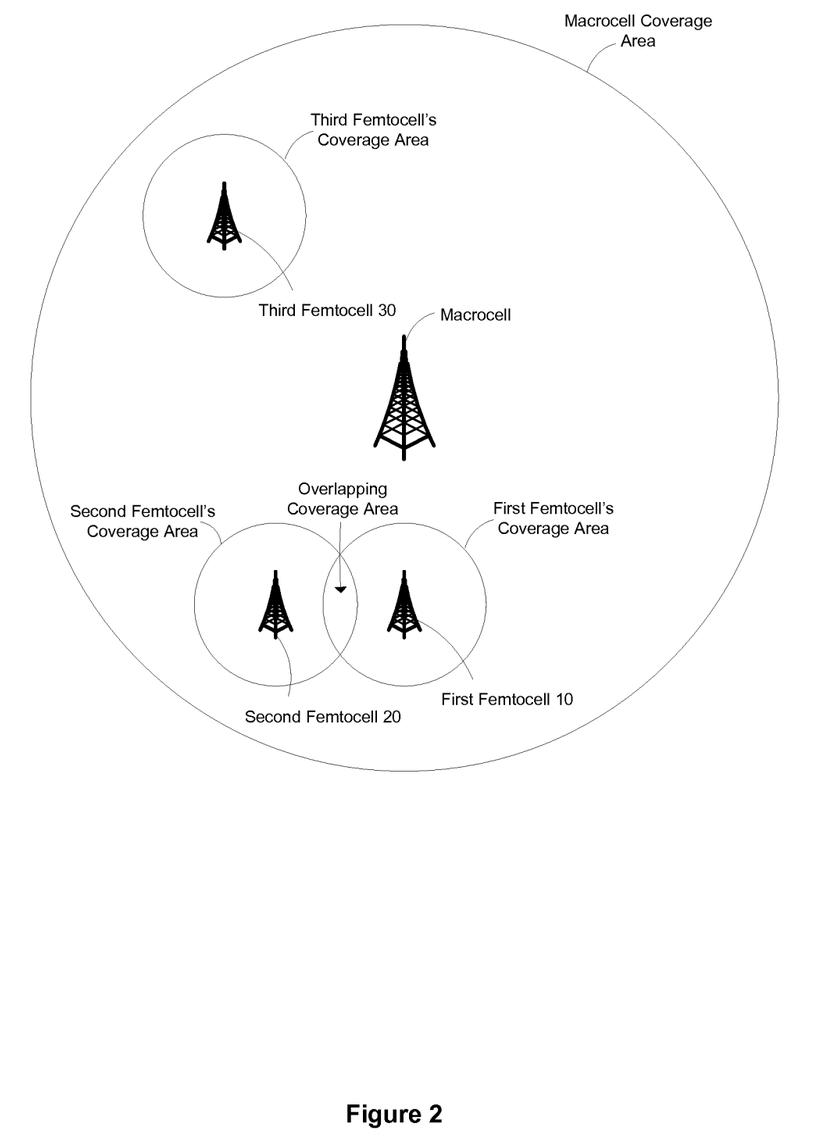
FIG. 2 illustrates a telecommunications network of a first embodiment of the present disclosure, having a macrocell and a first, second and third femtocell, wherein the first and second femtocells have overlapping coverage areas.

A first embodiment of a telecommunications network 1 is shown in FIG. 2. The telecommunications network 1 includes a macrocell and first, second and third femtocells 10, 20, 30 distributed about the macrocell's coverage area. A User Equipment, UE, is able to roam between the macrocell and any of the plurality of femtocells 10, 20, 30, and participate in a communications session with any one of the macrocell or femtocells. The skilled person will understand that each femtocell 10, 20, 30 may be engaged in many communications sessions with many UEs, such that the resource demands on the femtocell can vary substantially depending on the number of UEs and the particular services being used on each (for example, several UEs all streaming live video will have a very large resource demand on a femtocell, whereas one or several UEs in idle mode will have little or no resource demand). This variation of resource demand can also change suddenly (such as when a live video stream ends), such that the resource allocation algorithm for each femtocell should be highly adaptive to changing resource conditions, thus ensuring that the overall bandwidth in the network is apportioned to femtocells according to their resource demands at that time.

As shown in the Figure, the first and second femtocells 10, 20 have overlapping coverage areas, such that they are neighboring femtocells. The coverage area of the third femtocell 30 does not overlap with either the first or second femtocell 10, 20. Accordingly, transmissions from the first and second femtocell 10, 20 to their UEs within the overlapping coverage area cannot use the same Resource Block due to the high level of interference (however, the first and second femtocells 10, 20 can use the same Resource Block for transmissions to UEs not in the overlapping coverage area, as there is no risk of interference if a power level of a transmission to that UE ensures that the transmission does not enter the overlapping coverage area). In order to avoid interference for transmissions to UEs within the overlapping coverage area, the first and second femtocells 10, 20 implement a method of the present disclosure to allocate their Resource Blocks for these transmissions. Before detailing the method of the present disclosure, a general overview of a femtocell and a Resource Block will be described.

Figure 3:
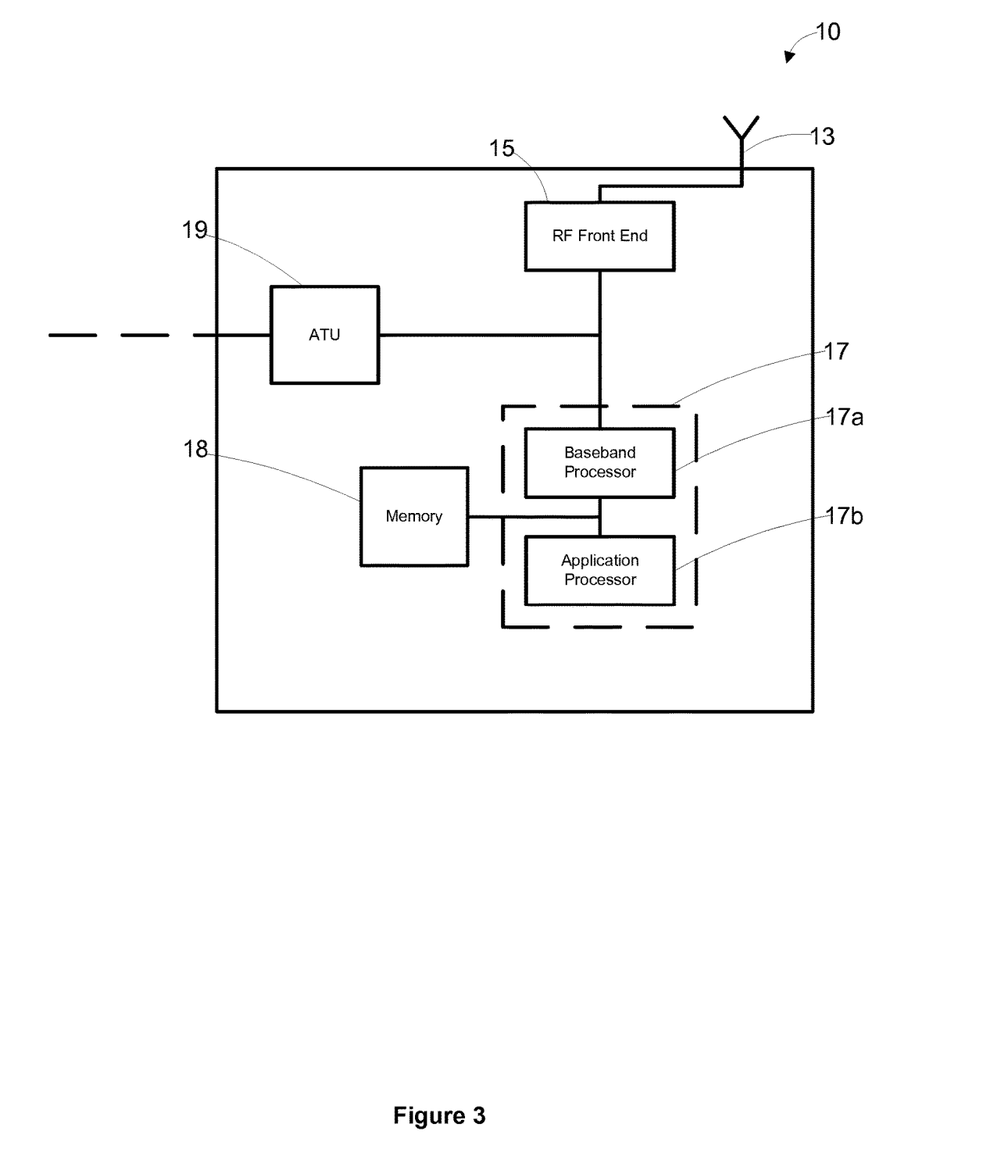
FIG. 3 is a schematic diagram of the first femtocell of FIG. 2.

In this embodiment, the femtocells 10, 20, 30 all operate in accordance with the LTE protocol stack. A schematic diagram of the first femtocell 10 is shown in FIG. 3 (and the skilled person will understand that the second and third femtocell 20, 30 have a similar configuration), which illustrates an antenna 13, an RF front end 15, a processor 17

(including a baseband processor 17a and application processor 17b), memory 18, and a backhaul 19 (e.g. an ADSL terminal unit, ATU). As is known in the art, the RF front end 15 is a module adapted to process RF signals sent and received via the antenna 13, the baseband processor 17a acts as a mobile termination component adapted to perform common RF transmission functions (e.g. encoding, decoding, error detection, etc.), and the application processor 17b acts as a terminal equipment component adapted to process high level functions. The processor 17 is connected to the RF front end 15, memory 18 and ATU 19.

In this embodiment, the baseband processor 17a is adapted for communications in accordance with the LTE protocol stack (i.e. L1, MAC, RLC, PDCP, RRC). The baseband processor 17a therefore acts as a scheduler for allocating Resource Blocks for its own transmission to any UE camped on the femtocell.

The Resource Block will now be described in more detail with reference to FIG. 4. A Resource Block represents a basic unit of resource for the LTE air-interface. When transferring data between the first femtocell 10 and a UE, the first femtocell's scheduler (in this case, the MAC scheduler of the baseband processor 17a) must allocate a plurality of Resource Blocks for the transfer. A Resource Block occupies a single 0.5 ms slot in the time domain, which is divided into several (usually 6 or 7) Orthogonal Frequency-Division Multiple Access, OFDMA, symbols, and, in the frequency domain, is divided into 12 subcarriers (each 15 Hz). The Resource Block therefore defines a grid of 72 or 84 Resource Elements, wherein each Resource Element can accommodate a single modulation symbol. The bit rate for the data transmission is thus defined by the number of Resource Blocks (and thus the number of Resource Elements, each accommodating one symbol) allocated to the transmission in the frequency domain and the modulation technique used.

Figure 4:
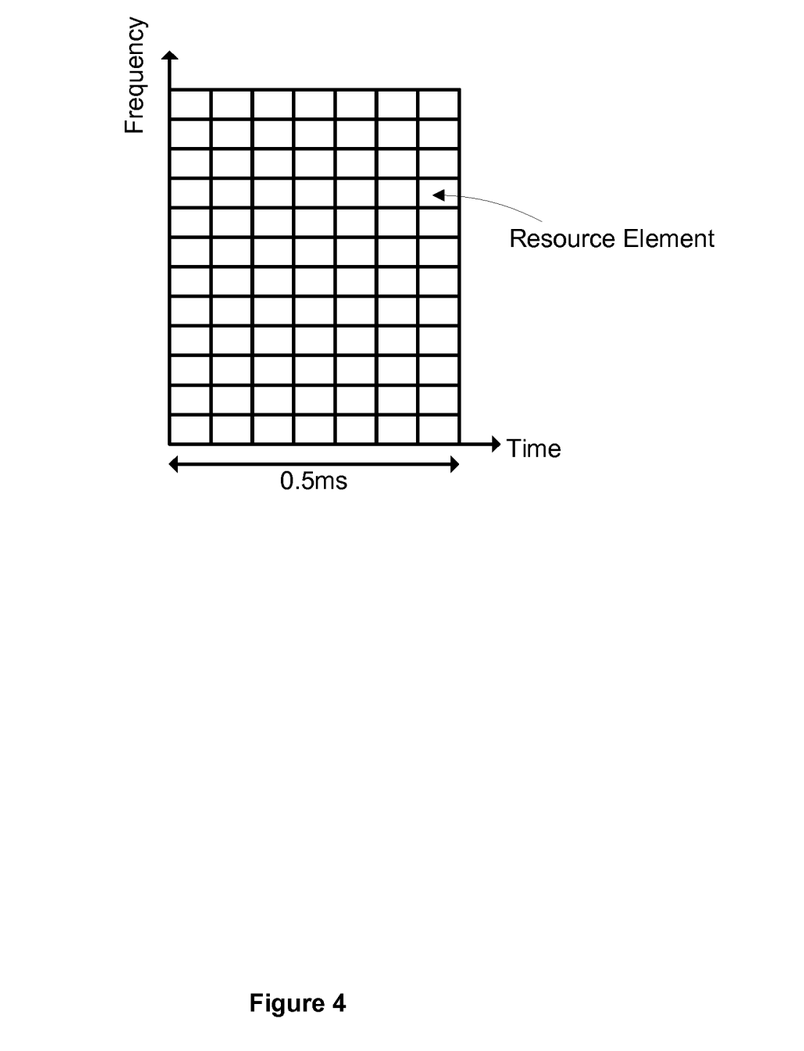
FIG. 4 is a schematic diagram of a Resource Block.
Figure 5:
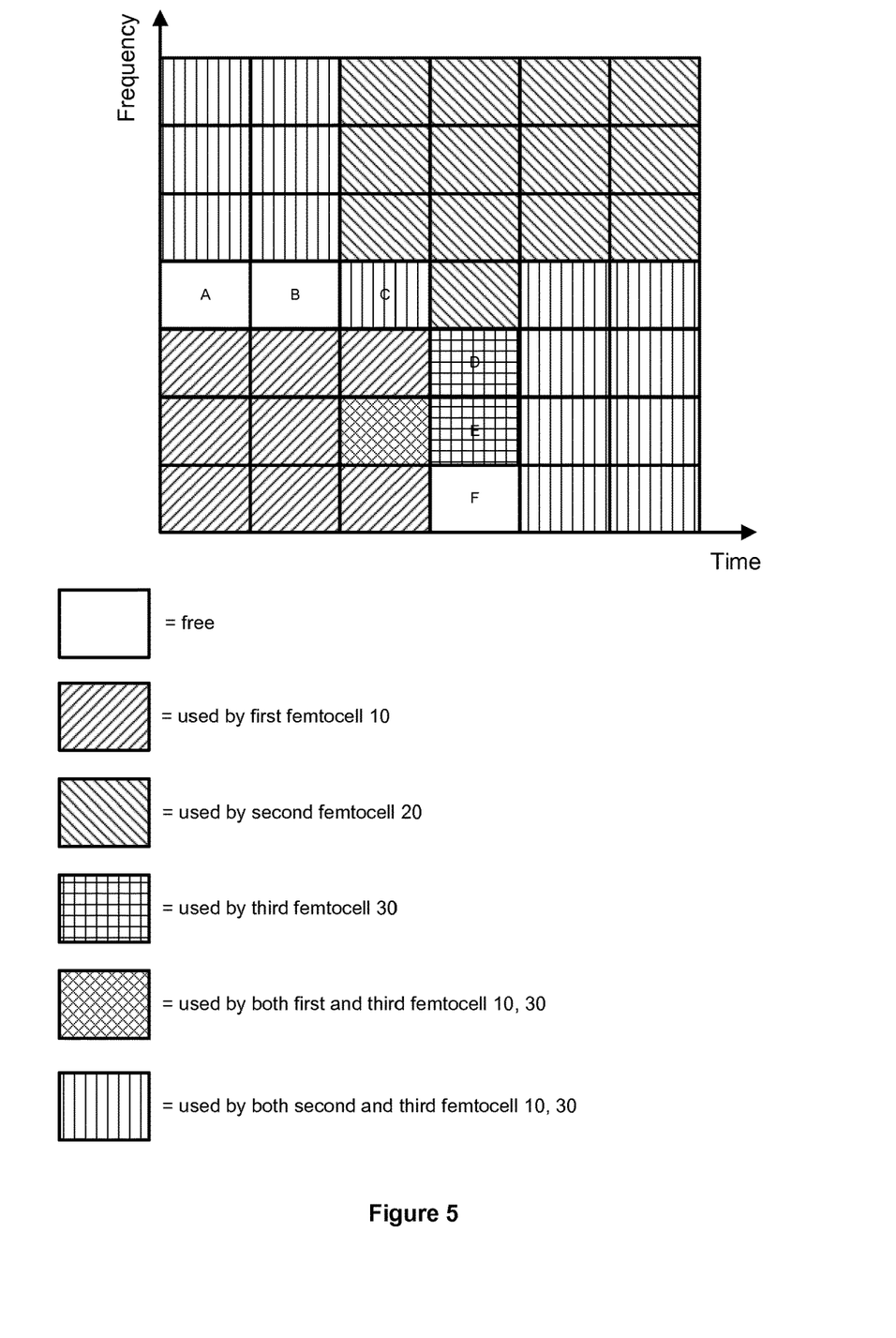
FIG. 5 is a graphical representation of an example resource allocation in the network of FIG. 2.

FIG. 5 illustrates an example Resource Block allocation for the first, second and third femtocells 10, 20, 30 (the skilled person will understand that FIG. 5 represents a matrix of Resource Blocks, wherein each unit in the matrix has the form illustrated in FIG. 4). In this example, some Resource Blocks are shared between the first and third femtocells 10, 30, some Resource Blocks are shared between the second and third femtocells 20, 30, and some Resource Blocks are not used by any of the femtocells. The skilled person will understand that the third femtocell 30 may share Resource Blocks with either the first and second femtocells 10, 20 without risk of any interference for any power level, as their coverage areas do not overlap.

Figure 6:
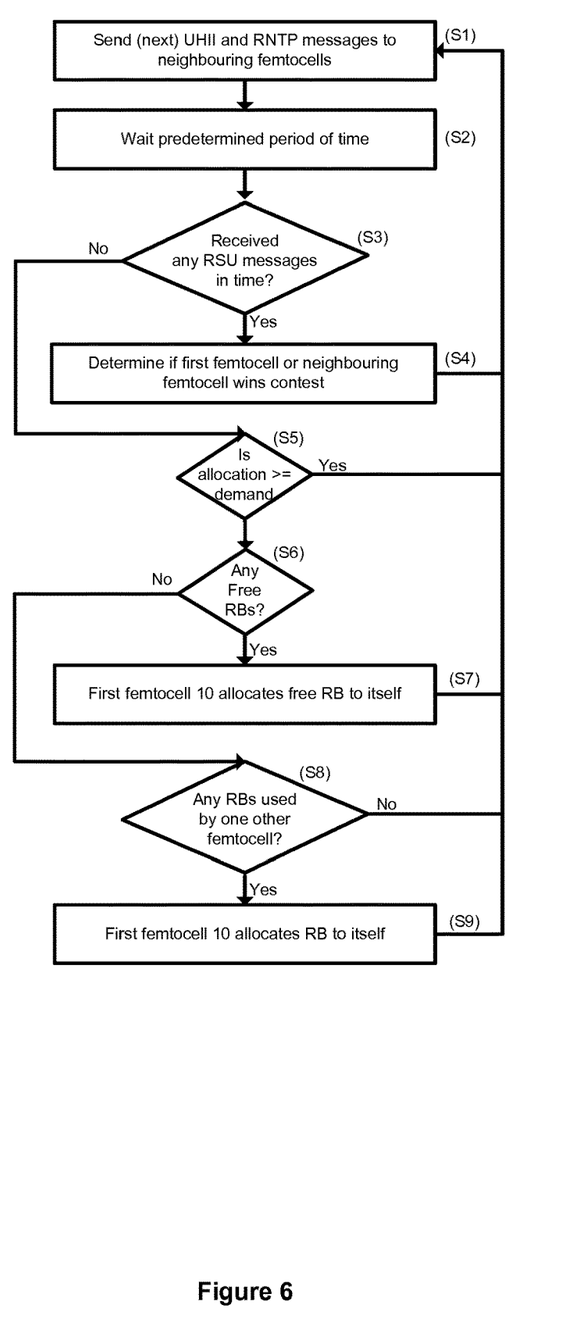
FIG. 6 is a flow diagram illustrating a first embodiment of a method of the present disclosure.

A method of adapting the Resource Block allocation of the first femtocell 10 will now be described with reference to FIG. 6. In S1, each femtocell sends an Uplink High Interference Indication, UHII, and Relative Narrowband Transmit Power, RNTP, message to its neighboring femtocells (that is, all femtocells with which it has an overlapping coverage area). These messages are X2 messages and indicate the identities of each Resource Block allocated to that femtocell for uplink and downlink transmissions respectively. The processors of each femtocell are configured to process these messages in order to populate a data set indicating the Resource Block allocation of all neighboring femtocells, which is then stored in memory. Furthermore, each femtocell is configured to send these messages at regular intervals (e.g. every 100 ms), such that the data set can be regularly updated with the Resource Block allocation of all neighboring femtocells.

Accordingly, in this embodiment, both the first femtocell 10 and the second femtocell 20 send UHII and RNTP messages to each other every 100 ms, and the first and second femtocells 10, 20 populate a data set indicating the Resource Block allocation of the second and first femtocell 20, 10 respectively. The data set, which is stored in memory 18, is illustrated graphically in FIG. 7 (the skilled person will understand that the data set only represents the Resource Block allocation of neighboring femtocells, and is therefore a portion of the network's Resource Block allocation shown in FIG. 5). As the third femtocell 30 does not have any neighboring femtocells in this embodiment, it does not receive any UHII or RNTP messages and so does not populate a corresponding data set.

Returning to FIG. 6, the first femtocell 10 then waits a predetermined amount of time (in S2) before checking if any Resource Status Update, RSU, messages are received from neighbouring femtocells in response to the UHII and RNTP message (S3). In a first phase of the method, there are no RSU messages and the following description will initially skip from S3 to S5 (this will become clear to the reader upon review).

In S5, the first femtocell 10 determines whether its resource allocation is greater than its demand. In this first example, the first femtocell 10 determinates that its current resource allocation is less than its current resource demand and thus moves to S6. The first femtocell 10 may calculate its current resource demand by determining the total bit rate required by all its served UEs (i.e. instantaneous and guaranteed) and converting this to the corresponding number of Resource Blocks based on the particular modulation technique used. The resource demand is stored in memory 18 as value r. The first femtocell 10 also stores its current resource allocation (i.e. number of Resource Blocks currently allocated to it) in memory 18 as value n. The processor 17 may therefore detect that its resource demands have increased and are no longer supported by its current allocation by comparing the values r and n. For example, if the value of r divided by n exceeds 1, the first femtocell 10 may determine that the resource demands are no longer supported by the current resource allocation. The first femtocell 10 may then calculate the number of extra Resource Blocks required by subtracting n from r.

In the following example, the first femtocell 10 calculates that it needs six extra Resource Blocks to satisfy the current resource demand, and increases its resource allocation to meet this demand in the following manner.

Figure 7:
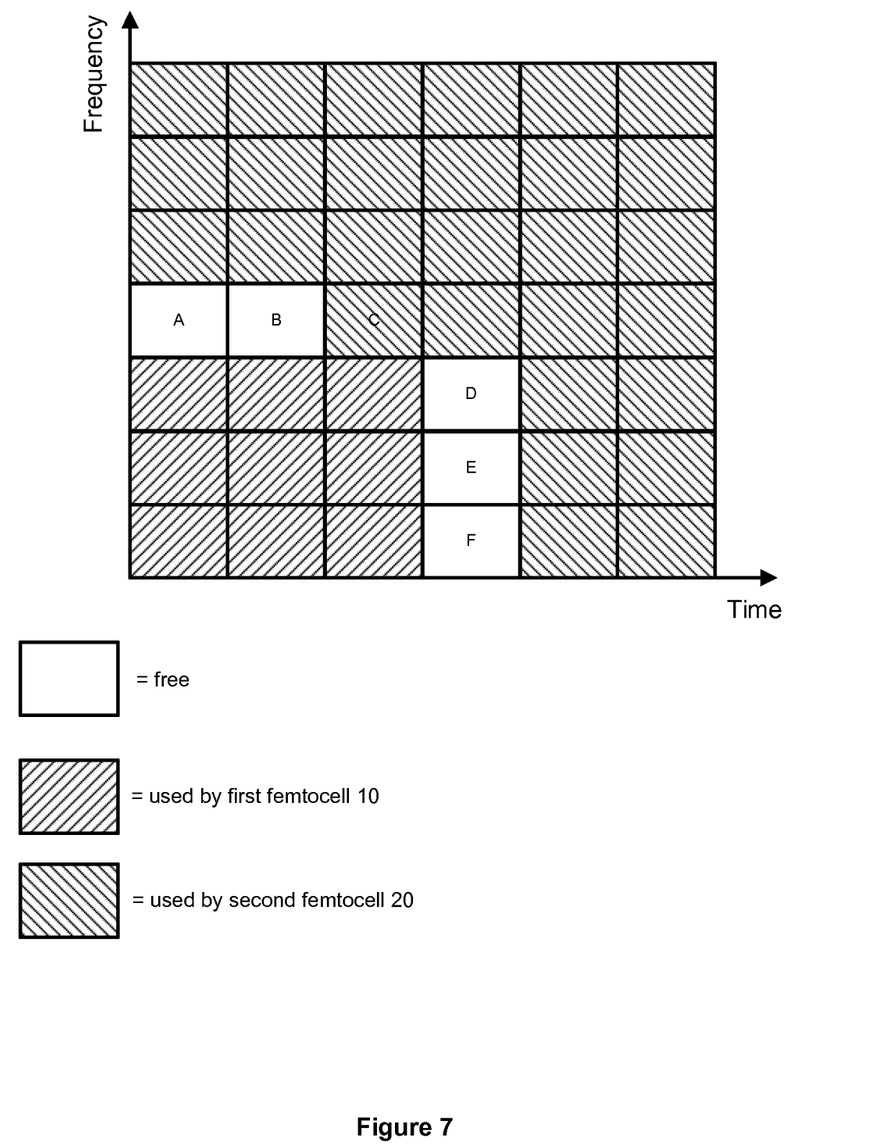
FIG. 7 is a graphical representation of a data set produced by the first femtocell according to the method of FIG. 6.

The network 1 operates a distributed resource allocation architecture, such that each femtocell is configured to self-allocate Resource Blocks. In S6, the first femtocell 10 allocates Resource Blocks to itself by first consulting the data set to determine if there are any Resource Blocks that are free (i.e. not being used by any neighboring femtocell) which are also adjacent any Resource Block currently allocated to it. As shown in FIG. 7, there are five such free Resource Blocks (A, B, D, E and F). The first Resource Block to be allocated is allocated based on a random selection from the free Resource Blocks (S7).

The skilled person will understand that Resource Blocks may be allocated by the baseband processor 17a updating its MAC scheduler to use the free Resource Block, and sending the corresponding updated scheduling information to all UEs camped on the first femtocell 10. The first femtocell 10 may then start to send and receive transmissions from any one of the UEs camped on that basestation 10 using that Resource Block.

After allocating the free Resource Block to itself (in S7), the method then loops back to S1, such that the first femtocell 10 sends its next iteration of UHII and RNTP messages reflecting its new Resource Block allocation, and all neighboring femtocells update their data sets with this new information. The above process is then repeated (i.e. up to S7 and back to S1), such that the first femtocell 10 iteratively allocates all the five free Resource Blocks to itself.

In this embodiment, the first femtocell 10 must allocate one more Resource Block before it has enough resources to meet demand. Accordingly, in S6 after the five free Resource Blocks have been allocated to the first femtocell 10, the first femtocell 10 determines that there are no further free Resource Blocks available. The process therefore moves to S8, in which first femtocell 10 then consults the data set to determine if there are any Resource Blocks adjacent any Resource Block currently allocated to it that are only being used by one neighbor. As shown in FIG. 7, Resource Block C fulfils these criteria. Furthermore, the Resource Blocks above Resource Blocks A and B, and the Resource Blocks above Resource Blocks D, E and F also fulfill these criteria. The first femtocell 10 is thus configured to randomly select one of these Resource Blocks (in this example, Resource Block C is selected), which is then allocated to the first femtocell 10 (S9).

The method then loops back to S1, such that the first femtocell 10 sends its next iteration of the UHII and RNTP messages to the second femtocell 20, which have been updated to indicate that the first femtocell 10 has been allocated Resource Block C. Thus, in this embodiment, the second femtocell 20 receives the UHII and RNTP messages and updates its corresponding data set to indicate that the first femtocell 10 is also using Resource Block C. In response to detecting this conflict, the second femtocell 20 sends a message indicating its current resource demand to the first femtocell 10. In this embodiment, the message indicating the resource demand is a Resource Status Update, RSU, message. The RSU message is also an X2 message and includes a Composite Available Capacity, CAC, value (between 0 and 100), which can be scaled to indicate the resource demand of the femtocell.

In this embodiment, the RSU message includes a CAC value configured according to the following function:

$$CAC_i = \text{floor}\left(\left(\max\left(\frac{r_i}{n_i}, 10\right)\right) * 10\right)$$

Where $r_i$ is the resource demand of femtocell i (i.e. the number of Resource Blocks required by a femtocell i to meet its demand), $n_i$ is the resource allocation of femtocell i (i.e. the number of Resource Blocks currently allocated to femtocell i), the max function returns the ratio of the resource demand $r_i$ to the resource allocation $n_i$ up to a maximum value of 10, and the floor function returns the integer value. Thus, in this example, the first femtocell 10 has a resource allocation of 9 Resource Blocks (see FIG. 5), but has a resource demand of 15 Resource Blocks (i.e. 9 plus the additional 6). Thus, the first femtocell 10 has a composite available capacity value of 16. In this example, the second femtocell 20 has a resource allocation of 28 Resource Blocks, and a resource demand of 20. Thus, the second femtocell 20 has a composite available capacity value of 7.

The composite available capacity thus indicates a value between 0 and 100 in proportion to the resource demand of that femtocell.

S2 to S4 will now be described in more detail. After sending the updated UHII and RNTP messages to neighbor femtocells in S1, the first femtocell 10 waits a predetermined period of time (50 ms in this embodiment) for any RSU messages which may have been sent from its neighbors (S2). The first femtocell 10 therefore has a timer (implemented by the processor 17) to wait for a period of time after the UHII and RNTP messages are sent. In this example, the first femtocell 10 receives an RSU message from the second femtocell 20 (S3), which is stored in memory 18. Upon expiry of the timer, the method proceeds to S4, in which the first femtocell 10 is configured to perform a tournament based algorithm to determine which of the two femtocells 10, 20 should "win" the Resource Block (i.e. be allowed to continue using the Resource Block) and which should "lose" the Resource Block (i.e. no longer be allowed to use the Resource Block). In this embodiment, the first femtocell 10 executes an algorithm having two possible outcomes (i.e. winner=[first femtocell, second femtocell]), in which the probability of the first femtocell 10 winning the Resource Block, $P_1$, is given by:

$$P_1 = \frac{(r_1/n_1)^\alpha}{(r_1/n_1)^\alpha + (r_2/n_2)^\alpha}$$

In which $r_i$ is the resource demand of femtocell i, $n_i$ is the current resource allocation of femtocell i, and $\alpha$ is a non-linearity parameter. In this embodiment, the CAC value is used as the resource demand of the femtocell. According to this algorithm, the probability the first femtocell 10 will win the tournament is proportional to the ratio of its resource demand, r, to its current resource allocation, n, and inversely proportional to the sum of the ratios of both the first and second femtocell's demand to their resource allocations. Accordingly, the greater the resource deficit of the first femtocell 10 (i.e. the amount the resource demand exceeds the resource allocation), the greater the likelihood it will be allowed to continue to use the Resource Block. This probability is offset in the event the second femtocell 20 has a relatively large resource deficit.

In a first example, the first femtocell 10 wins the contest and is allowed to continue to use Resource Block C. The method of the present disclosure loops back to S1 and sends the next iteration of UHII and RNTP messages to the second femtocell 20, indicating that the first femtocell 10 is still using Resource Block C. In response to receiving the updated UHII and RNTP messages, the second femtocell 20 determines that it lost the tournament and can no longer use that Resource Block. The second femtocell 20 therefore stops using Resource Block C by updating its MAC scheduler and sending the updated scheduling information to all UEs camped on the second femtocell 20.

The first femtocell 10 waits a predetermined amount of time for any RSU messages from neighboring femtocells (S2). In this example, the first femtocell 10 does not receive any RSU messages and proceeds to S5. As the first femtocell 10 now has a further six Resource Blocks, it determines that it can meet resource demands and loops back to S1. The method therefore loops between S1 and S5 continually until the resource allocation no longer meets demand.

In another example, the first femtocell 10 loses the contest and is not allowed to continue to use Resource Block C. The first femtocell 10 therefore stops using Resource Block C by updating its MAC scheduler. The next iteration of the UHII and RNTP messages sent to the second femtocell 20 therefore indicates that the first femtocell 10 is not using Resource Block C. In response, the second femtocell 20 determines that it won the tournament and is therefore allowed to continue to use Resource Block C. The first femtocell 10 may then challenge for the Resource Blocks above Resource Blocks A and B, or the Resource Blocks to the right of Resource Blocks D, E and F in the next iteration of the process (although the skilled person will understand that, in a real world scenario, it is likely that there are other Resource Blocks currently allocated to other femtocells, and the first femtocell 10 can challenge for those Resource Blocks in the next iteration of the process).

The present disclosure therefore provides a distributed method of allocating Resource Blocks in a small cell network such that each small cell may capture Resource Blocks of its neighboring cells. Then, in order to determine which small cell should continue to use that Resource Block, the small cells engage in a contest in which the winner (and thus the future owner of the Resource Block) is likely to be the small cell with the greatest resource deficit. This allows the small cell network to allocate Resource Blocks equitably in the network such that a greater amount of resources are allocated to small cells with the greatest need, and small cells with a greater resource surplus (i.e. a resource allocation greater than its resource demands) are more likely to lose the contest to a challenger. Furthermore, as small cells may capture Resource Blocks (e.g. expand their resource "territory" in the frequency/time slot domain) autonomously and then resolve any conflict in an equitable manner, the resource allocation across the small cell network is highly dynamic and reactive to changing resource demands without using a centralized resource management unit, which would otherwise incur a significant resource penalty due to the increase in control traffic.

Figure 8:
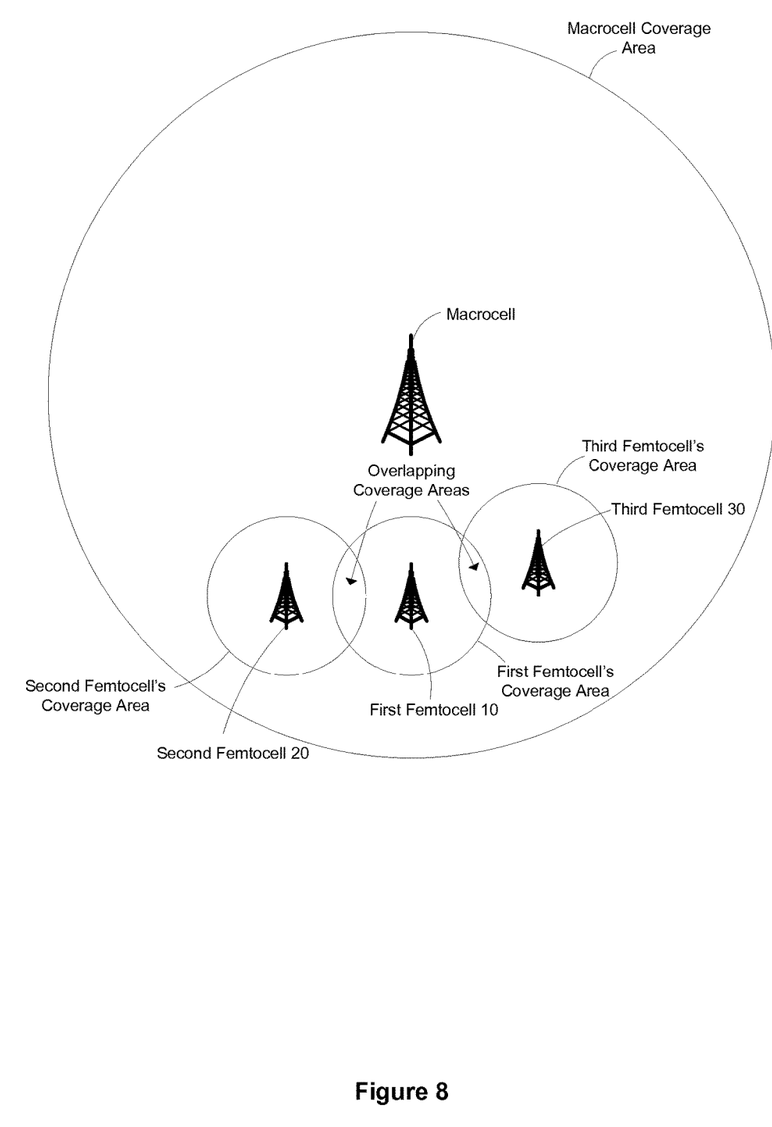
FIG. 8 illustrates a telecommunications network of a second embodiment of the present disclosure, having a macrocell and a first, second and third femtocell, wherein the first femtocell has overlapping coverage areas with the second and third femtocells.

A second embodiment of the present disclosure will now be described with reference to FIG. 8. In this embodiment, the first femtocell 10 has an overlapping coverage area with both the second and third femtocells 20, 30, although the second and third femtocells 20, 30 do not have overlapping coverage areas with each other. Accordingly, the first femtocell 10 cannot use the same Resource Block as the second or third femtocells for transmissions to any UE in the overlapping coverage area with the second or third femtocell respectively, but the second and third femtocells can use the same Resource Blocks for all transmissions.

Figure 9:
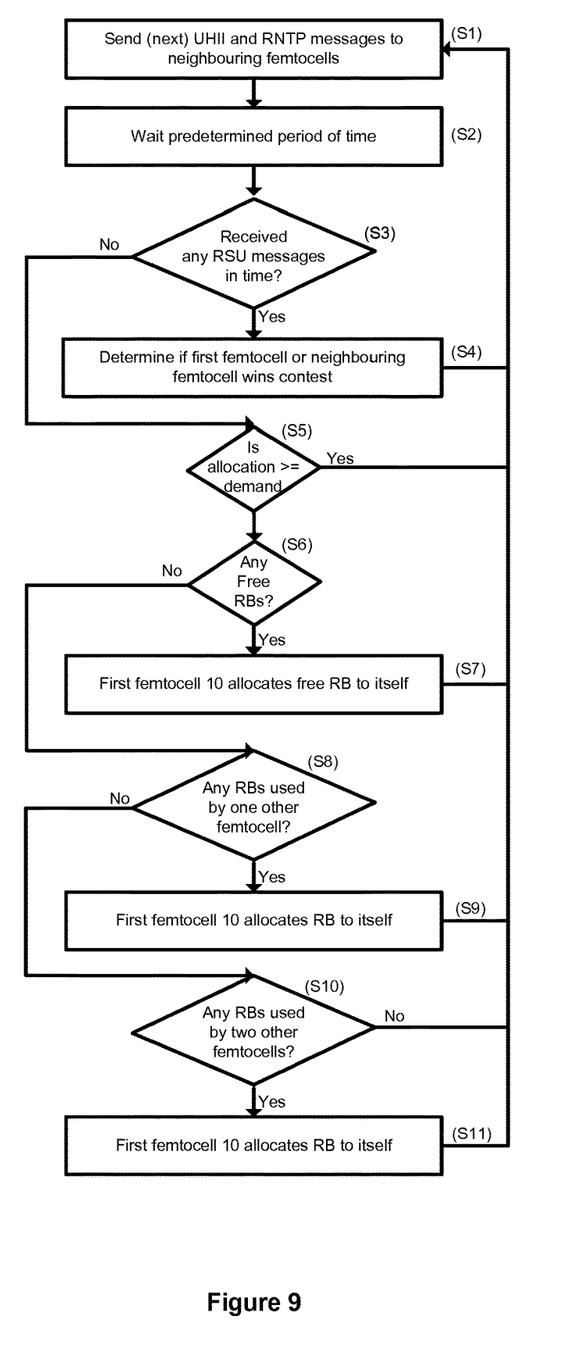
FIG. 9 is a flow diagram illustrating a second embodiment of a method of the present disclosure.
Figure 10:
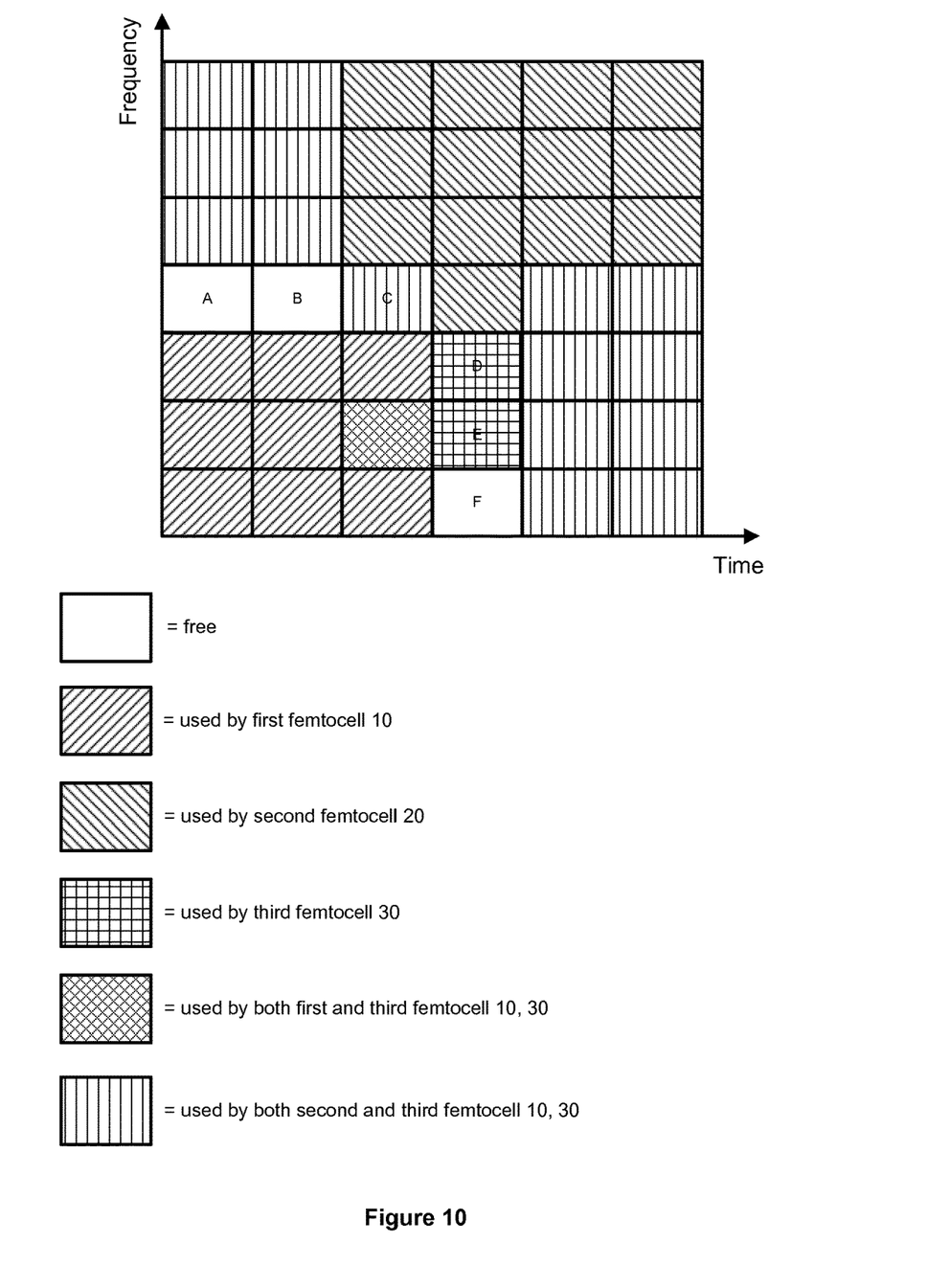
FIG. 10 is a graphical representation of a data set produced by the first femtocell according to the method of FIG. 9.

A second embodiment of a method of adapting the Resource Block allocation of the first femtocell 10 will now be described with reference to FIG. 9. In S1, the first, second and third femtocells 10, 20, 30 all send UHII and RNTP messages to each other on a periodic basis, indicating their Resource Block allocation. On receipt of these messages, each femtocell is configured to populate and update a data set indicating the identities of the neighboring femtocells and the identities of the Resource Blocks allocated to them. The data set populated by the first femtocell 10 is represented in FIG. 10 (the skilled person will understand that, as the first, second and third femtocells are the only small cells in the network and the second and third femtocells have an overlapping coverage area with the first femtocell 10, the data set populated by the first femtocell 10 is also the entire resource allocation across the network, as shown in FIG. 5).

As in the first embodiment, the first femtocell 10 then waits a predetermined period of time (S2) and determines if it has received any RSU messages (S3). In this example, the first femtocell does not receive any RSU messages, such that the method skips from S3 to S5 in which the first femtocell 10 detects that it needs to increase its resource allocation. This may be calculated in the same manner as the first embodiment, and, in this example, the first femtocell 10 again calculates that it needs an extra six Resource Blocks in order to meet its current resource demands and thus moves to S6.

The first femtocell 10 then iteratively allocates Resource Blocks to itself by firstly consulting the data set to determine if there are any Resource Blocks that are free (i.e. not being used by any neighboring femtocell) which are also adjacent any Resource Block currently allocated to it (S6). As shown in FIG. 10, there are three such free Resource Blocks (A, B and F). These three free Resource Blocks are then iteratively allocated to the first femtocell 10 on a random basis (by looping through S1 to S7 until all three Resource Blocks have been allocated).

In the next iteration of the method, there are no RSU messages from neighboring femtocells and there are no free Resource Blocks remaining (such that the method skips from S3 to S5 and from S6 to S8). The first femtocell 10 therefore consults the data set to determine if there are any Resource Blocks adjacent its current Resource Block allocation which are being used by only one other neighboring femtocell. The first femtocell 10 determines that Resource Blocks D and E satisfy these criteria and thus moves to S9.

In S9, the first femtocell 10 randomly allocates one of the Resource Blocks (Resource Block D) to itself and updates its MAC scheduler accordingly. The method then loops back to S1, and the first femtocell 10 sends updated UHII and RNTP messages to the second and third femtocells 20, 30 indicating that the first femtocell 10 has been allocated Resource Block D. The first femtocell 10 then waits a predetermined period of time (S2) and determines if it has received any RSU messages from neighboring cells (S3). In this embodiment, both the second and third femtocells 20, 30 update their data sets to indicate that the first femtocell 10 is using Resource Block D. However, the third femtocell 30 determines that there is a conflict with its own Resource Block allocation and sends an RSU message, indicating its current Resource Block demands, to the first femtocell 10. As in the first embodiment, the first femtocell 10 carries out a tournament to determine which femtocell shall continue to use that Resource Block (S4).

In this example, the first femtocell 10 wins the tournament and therefore owns Resource Block D and the process loops back to S1. In the next iteration, the process skips from S3 to S5 and the first femtocell 10 determines that its resource demands still exceeds its allocation (by two Resource Blocks), and repeats S8 and S9 (after skipping from S6 to S8 as there are no free Resource Blocks) to allocate Resource Block E to itself. The process again loops back through S1 to S4, such that the first femtocell 10 receives an RSU message in response to the updated UHII and RNTP messages, and carries out a further tournament. Again, the first femtocell 10 wins the tournament and therefore owns Resource Block E.

The process again loops back to S1, and skips from S3 to S5 in the next iteration. The first femtocell 10 determines that its resource demands still exceeds its allocation (now by one Resource Block). However, there are now no free Resource Blocks (determined in step S6) or Resource Blocks that are being used by one other neighboring femtocell (determined in S8). Accordingly, the method skips to S10, in which the first femtocell 10 consults the data set to determine if there are any Resource Blocks adjacent its current Resource Block allocation which are being used by two neighboring femtocells. As shown in FIG. 10, Resource Block C, and the Resource Blocks above Resource Blocks A and B and to the right of Resource Blocks D, E and F satisfy these criteria. The first femtocell 10 therefore randomly selects one of these Resource Blocks (Resource Block C in this example).

In S11, the first femtocell 10 starts using this Resource Block by updating its MAC scheduler. The process loops back to S1, and the first femtocell 10 sends updated UHII and RNTP messages to the second and third femtocells 20, 30 indicating that the first femtocell 10 is using Resource Block C. The second and third femtocells 20, 30 both update their data sets, and both determine that there is a conflict. Accordingly, the second and third femtocells 20, 30 both send RSU messages to the first femtocell 10 indicating their current resource allocation.

The first femtocell 10 waits a predetermined period of time in S2 and receives both RSU messages from the second and third femtocells 20, 30 in S3. The skilled person will understand that the transmission delay between the various femtocells will differ (e.g. the physical line between the first and second femtocell may be shorter than that of the first and third femtocell). Accordingly, the first femtocell 10 receives the RSU message from the second femtocell 20 before it receives the RSU message from the third femtocell 30.

In S4, the first femtocell 10 is then configured to carry out a tournament (as in the first embodiment, above) with each neighboring femtocell separately and sequentially. Thus, the first femtocell 10 carries out a first contest with the second femtocell 20 (the outcome of the contest being that either the first or second femtocell 10, 20 may continue to use Resource Block C), followed by a second contest with the third femtocell 30 (the outcome of the contest being that either the first or third femtocell 10, 30 may continue to use Resource Block C). The first femtocell 10 may only use the Resource Block if it wins every contest.

In a first example, the first femtocell 10 wins both the contest with the second femtocell 20 and the contest with the third femtocell 30. The first femtocell 10 may therefore continue to use the Resource Block. The process loops back to S1 and sends the next iteration of UHII and RNTP messages to all neighboring femtocells (which indicate that the first femtocell 10 is using Resource Block C). The second and third femtocells 20, 30 receive the new UHII and RNTP messages, and determine that they lost the contest as the new UHII and RNTP messages still indicate that the first femtocell 10 is using Resource Block C. The second and third femtocells 20, 30 then both remove this Resource Block from their allocations. In this example, the first femtocell 10 has now been allocated six Resource Blocks and therefore meets its resource demands (determined in S5). The method of the present disclosure then continually loops through S1 to S5 (such that the first femtocell 10 continues to send periodic UHII and RNTP messages and monitors its own resource demands), until its detects that the resource demand exceeds its resource allocation.

In another example, the first femtocell 10 loses either or both of the contests with the second and third femtocells 20, 30. The first femtocell 10 is therefore not allowed to continue to use Resource Block C and removes it from its allocation. In the next iteration of UHII and RNTP messages, the messages indicate that the first femtocell 10 is no longer using Resource Block C. The second and third femtocells 20, 30, upon receiving this message, determine that they are free to use Resource Block C and thus the first femtocell 10 lost the contest.

The present disclosure thus iteratively allocates Resource Blocks to a femtocell by firstly allocating free Resource Blocks, then Resource Blocks which are being used by only one neighboring femtocell, then Resource Blocks which are being used by only two neighboring femtocells, and so on, until it has allocated enough Resource Blocks to meet its resource demands.

The specific embodiments above have been described to illustrate an implementation of the invention using messages from the current LTE standards. However, the skilled person will understand that the present invention may be implemented in many ways, using current or bespoke messages. That is, rather than using the UHII and RNTP messages to indicate the Resource Block usage, and the RSU message to indicate resource demand, the method may be implemented by using bespoke messages indicating the resource demands and resource allocation of the femtocells. For example, the femtocells can all periodically send a bespoke message to every other femtocell (indicating both the resource demand and resource allocation of that femtocell), and if one femtocell needs to increase its resource allocation it can select one Resource Block based on this data and use the above algorithm to determine which femtocell should be allocated that Resource Block.

Furthermore, the RSU message described above indicates the resource demand on the femtocell by using a particular formula to scale the resource demand between 0 and 100, which can then be included in the RSU message as the composite available capacity value. The skilled person will understand, however, that the use of this formula is non-essential.

Furthermore, the skilled person will understand that the UHII and RNTP messages described above do not indicate all Resource Blocks used by the femtocell, but Resource Blocks which may interfere with transmissions from neighboring cells. Thus, these messages provide enough information to implement the method of the present disclosure. However, as noted above, other messages may be used to provide a full account of the Resource Blocks used by the femtocell.

In the above description, a tournament based algorithm is used to determine which femtocell can use a Resource Block, wherein only the winner of the tournament may continue to use it. However, the skilled person will understand that a more sophisticated approach may be applied, as transmissions will only interfere if those Resource Blocks are transmitted into an overlapping coverage area of neighboring femtocells. Accordingly, if a femtocell is no longer allowed to use that Resource Block after the above algorithm is applied, it may not use that Resource Block for transmissions into the overlapping coverage area, but may continue to use it for transmissions outside that area (for example, by adapting the power levels for transmissions using that Resource Block).

Furthermore, the skilled person will understand that it is not essential for the first femtocell to use the exact algorithm above in order to determine which femtocell should be allocated the Resource Block. That is, the disclosure may ensure that the first femtocell allocates resources in an equitable manner by using the first femtocell's resource demand as a factor of any allocation algorithm. The allocation algorithm may be further improved by also using the first femtocell's resource allocation, or the Resource Block's current owner's resource demand or allocation as further factors. The skilled person will also understand that the use of the non-linearity parameter in the allocation algorithm is also non-essential, but allows the Network Operator to modulate the contest between two femtocells by tailoring this number (e.g. a higher number will emphasize the difference between the ratios of the resource demand to the resource allocation, thus making it more likely that the femtocell with the greatest resource deficit will win the contest).

In the above embodiments, if the challenging femtocell loses a contest for a Resource Block, it then challenges for another Resource Block in the next iteration of the process. In a network of several femtocells, the challenging femtocell may keep a memory of results of recent challenges, and then select another Resource Block to challenge for which is not currently allocated to a femtocell which it has recently lost to. In a further improvement, the challenging femtocell may store the current resource allocation and the resource demand of all neighboring femtocells (from the periodic UHII and RNTP messages and any recent RSU messages) in memory, and then challenge for a Resource Block which is currently owned by a femtocell with the smallest ratio of resource demand to resource allocation. This makes it more likely that the challenging femtocell will win the contest (if it loses, it can then challenge for a Resource Block owned by a femtocell with the next smallest ratio of resource demand to resource allocation, and so on).

In the second embodiment, the challenging femtocell carries out a contest with both other femtocells to decide which femtocell may continue to use that Resource Block. These contests may be carried out in the order in which the RSU messages are received. In an improvement, the challenging femtocell may carry out the contest with the strongest neighbor (i.e. the neighbor having the greatest ratio of resource demand to resource allocation). As the challenging femtocell is more likely to lose this contest, it is more efficient to run this contest first (so updated RHII and UHII messages can be sent out earlier if it loses).

The above algorithm is implemented when the resource demand for a femtocell exceeds its resource allocation. The skilled person will understand that this may occur if the resource demand on a femtocell increases significantly (e.g. due to a UE using intensive data services, such as live video) or when the resource allocation decreases (e.g. due to another femtocell in the network, also implementing the method of the present disclosure, captures Resource Blocks from the first femtocell).

The embodiments above describe allocation of Resource Blocks (also known as Physical Resource Blocks) in small cell networks. At the time of writing, Resource Blocks are the current standard unit of resource used in LTE networks, but the skilled person will understand that the present disclosure may also be applied to any unit of resource in current or future small cell systems (such as individual subcarriers).

In the above embodiments, the first femtocell consults the data set to determine which Resource Blocks are adjacent its current allocation and are either free or are currently used by one or more neighboring femtocells. The first femtocell may then try to capture these Resource Blocks. It is non-essential that the first femtocell only captures Resource Blocks which are adjacent its current Resource Block allocation. However, the skilled person will understand that by only using Resource Blocks in a group then the level of interference in the network can be reduced and the UE scheduling can be more efficient.

The skilled person will also understand that it is not essential that the method of the disclosure is implemented in a single processing unit. That is, one or more tasks of the method may be implemented in one or more processing units, which may be integrated into the femtocell or in a separate unit. For example, the processing units may include a detector module configured to detect that the femtocell's resources exceeds its allocation, a selector module configured to select a new resource that is being used by another femtocell, and a resource allocator module configured to allocate the new resource to either the femtocell or the other femtocell. Furthermore, the skilled person will understand that the present disclosure is applicable to all forms of small cells (such as pico cells, microcells or metrocells), and not just femtocells.

In the above embodiments, the femtocells send the UHII and RNTP messages at regular intervals of 100 ms. The skilled person will understand that it is not essential that the interval is 100 ms or that the interval is regular. For example, the messages can be sent out after an interval of random length, which ensures that the order of any resulting contest is randomized. In another arrangement, the interval could be regular and synchronized between femtocells.

The skilled person will understand that any combination of features is possible within the scope of the invention, as claimed.

The invention claimed is:

1. A method of allocating a resource in a network of small cells, the method comprising:
    a first small cell detecting that a resource demand of the first small cell exceeds a resource allocation of the first small cell;
    the first small cell selecting a new resource that is being used by a second small cell;
    the first small cell determining whether the new resource should be allocated to either the first small cell or the second small cell, wherein a probability the new resource is allocated to the first small cell is proportional to a ratio of the resource demand of the first small cell to the resource allocation of the first small cell and is inversely proportional to a sum of a) a ratio of the resource demand of the first small cell to the resource allocation of the first small cell and b) a ratio of a resource demand of the second small cell to a resource allocation of the second small cell; and
    the first small cell allocating the new resource according to the determined allocation.

2. A method as claimed in claim 1, wherein the probability, $P_1$, the new resource is allocated to the first small cell is defined by:

$$P_1 = \frac{(r_1/n_1)^\alpha}{(r_1/n_1)^\alpha + (r_2/n_2)^\alpha}$$

in which $r_i$ is the resource demand of small cell i, $n_i$ is the current resource allocation of small cell i, and $\alpha$ is a nonlinearity parameter.

3. A method as claimed in claim 1, further comprising:
    the first small cell iteratively allocating new resources to the first small cell until the resource allocation of the first small cell satisfies the resource demand of the first small cell.

4. A method as claimed in claim 3, further comprising, initially:
    the first small cell determining a resource block allocation of the second small cell; and before the selecting,
    the first small cell allocating a free resource to the first small cell until there are no further free resources.

5. A method as claimed in claim 1, further comprising:
    the first small cell selecting a new resource that is being used by the second small cell and a third small cell; and the first small cell allocating the new resource to either the first small cell or both the second small cell and the third small cell based on the resource demands of the first small cell.

6. A non-transitory computer-readable storage medium comprising computer-executable code which, when executed on a computer, causes the computer to perform the method of claim 1.

7. A device for allocating a resource in a network of small cells, the device comprising:
 a processor to:
  detect that a resource demand of a first small cell exceeds a resource allocation of the first small cell;
  select a new resource that is being used by a second small cell; and
  allocate the new resource to either the first small cell or the second small cell, wherein a probability the new resource is allocated to the first small cell is proportional to a ratio of the resource demand of the first small cell to the resource allocation of the first small cell and is inversely proportional to a sum of a) a ratio of the resource demand of the first small cell to the resource allocation of the first small cell and b) a ratio of a resource demand of the second small cell to a resource allocation of the second small cell.

8. A device as claimed in claim 7, wherein the probability the probability, $P_1$, the new resource is allocated to the first small cell is defined by:

$$P_1 = \frac{(r_1/n_1)^\alpha}{(r_1/n_1)^\alpha + (r_2/n_2)^\alpha}$$

in which $r_i$ is the resource demand of small cell i, $n_i$ is the current resource allocation of small cell i, and $\alpha$ is a nonlinearity parameter.

9. A device as claimed in claim 7, wherein the processor is configured to iteratively allocate resources to the first small cell until the resource allocation of the first small cell satisfies the resource demand of the first small cell.

10. A device as claimed in claim 9, wherein the processor is further configured to detect the resource allocation of the second small cell, and to allocate a free resource to the first small cell until there are no further free resources.

11. A device as claimed in claim 7, wherein the processor is configured to select a new resource that is being used by the second small cell and a third small cell, and to allocate the new resource to either the first small cell or the second small cell and the third small cell based on the resource demand of the first small cell.

* * * * *